United States Patent
Meier

(10) Patent No.: US 9,051,137 B2
(45) Date of Patent: Jun. 9, 2015

(54) CEMENT SILO LOADING SYSTEM

(76) Inventor: Vincent R. Meier, Topeka, KS (US)

( * ) Notice: Subject to any disclaimer, the term of this patent is extended or adjusted under 35 U.S.C. 154(b) by 729 days.

(21) Appl. No.: 13/310,360

(22) Filed: Dec. 2, 2011

(65) Prior Publication Data

US 2012/0145262 A1 Jun. 14, 2012

Related U.S. Application Data

(60) Provisional application No. 61/419,601, filed on Dec. 3, 2010.

(51) Int. Cl.
*B65G 65/32* (2006.01)
*B65G 69/00* (2006.01)
*B60P 1/58* (2006.01)
*B65G 53/42* (2006.01)

(52) U.S. Cl.
CPC ............... *B65G 65/32* (2013.01); *B65G 69/00* (2013.01); *B60P 1/58* (2013.01); *B65G 53/42* (2013.01)

(58) Field of Classification Search
CPC .............. B60P 3/426; B60P 1/56; B60P 1/34; B60P 3/122; B60P 3/025; B60P 1/025; B60P 1/431; B60P 1/38; B60P 1/16; B60P 1/165; B60P 1/045; B60P 1/30; B60P 1/58; B60P 1/283; B65D 88/64; B65D 88/62; B65D 88/30; B65D 88/56; B65G 69/0441; B65G 69/0458; B65G 65/32; B65G 69/00; B65G 63/067; B65G 65/4836; B65G 65/44; B65G 67/30; B65G 67/42; B65G 67/40; B65G 67/00; B65G 41/002; B65G 65/23; B65G 65/24; B65G 53/42; B65G 53/32; B65F 3/20; B65F 9/00; B65F 3/205; B65F 3/28; B30B 93/042; B66F 7/22; A01D 90/08; A01D 90/083; A01D 85/005; B28C 7/0495; B28C 9/0418; B28C 5/1292; E01C 19/10; E01C 19/203; B22D 41/13; A47K 5/13; A47L 15/4409; A01C 17/00; A01C 15/18; E01H 10/007; F16N 5/00; E04G 21/20; B01F 15/0251; B01F 7/00708; B01F 7/00391; C04B 40/0028
USPC ......... 414/288, 293, 304, 385, 471, 501, 332, 414/299, 808, 572; 222/166, 626; 298/8 T; 366/38

See application file for complete search history.

(56) References Cited

U.S. PATENT DOCUMENTS 2,269,561 A 1/1942 Strayer
2,756,881 A 7/1956 Sims
(Continued)

FOREIGN PATENT DOCUMENTS

JP 58152719 9/1983

*Primary Examiner* — Saul Rodriguez
*Assistant Examiner* — Glenn Myers
(74) *Attorney, Agent, or Firm* — Erickson Kernell Derusseau & Kleypas, LLC

(57) ABSTRACT

A cement silo is rapidly loaded with cement which is sequentially delivered to a cement receiver at the silo by dump trucks. The receiver extends to a blowoff station at the base of the silo, and a riser pipe extends from the blowoff station to an upper end portion of the silo and discharges the cement downwardly thereinto. Loads of cement are thus rapidly sequentially delivered to the silo, and each unloaded truck may quickly leave the site and pick up another load while the next truck delivers its load of cement. This system thus provides rapid sequential unloading and a quick return to service of each unloaded truck.

8 Claims, 7 Drawing Sheets

(56) References Cited

U.S. PATENT DOCUMENTS

| | | | |
|---|---|---|---|
| 3,154,202 A | 10/1964 | Heltzel | |
| 3,260,414 A | 7/1966 | Mora | |
| 4,187,047 A * | 2/1980 | Squifflet, Sr. | 414/332 |
| 4,242,223 A * | 12/1980 | Christner et al. | 516/93 |
| 4,247,228 A * | 1/1981 | Gray et al. | 406/39 |
| 4,479,362 A * | 10/1984 | McWhorter et al. | 62/63 |
| 4,568,239 A | 2/1986 | Sims | |
| 4,775,275 A | 10/1988 | Perry | |
| 5,096,336 A | 3/1992 | Merrett et al. | |
| 6,409,274 B1 * | 6/2002 | Merrett | 298/17 R |
| 6,527,428 B2 | 3/2003 | Guntert, Jr. et al. | |
| 6,698,993 B2 * | 3/2004 | Stephens | 414/332 |
| 7,063,497 B2 * | 6/2006 | Mast et al. | 414/572 |
| 2002/0034120 A1 * | 3/2002 | Guntert et al. | 366/2 |
| 2002/0181319 A1 * | 12/2002 | Dahlinger et al. | 366/42 |
| 2009/0135665 A1 * | 5/2009 | Contamin et al. | 366/41 |

* cited by examiner

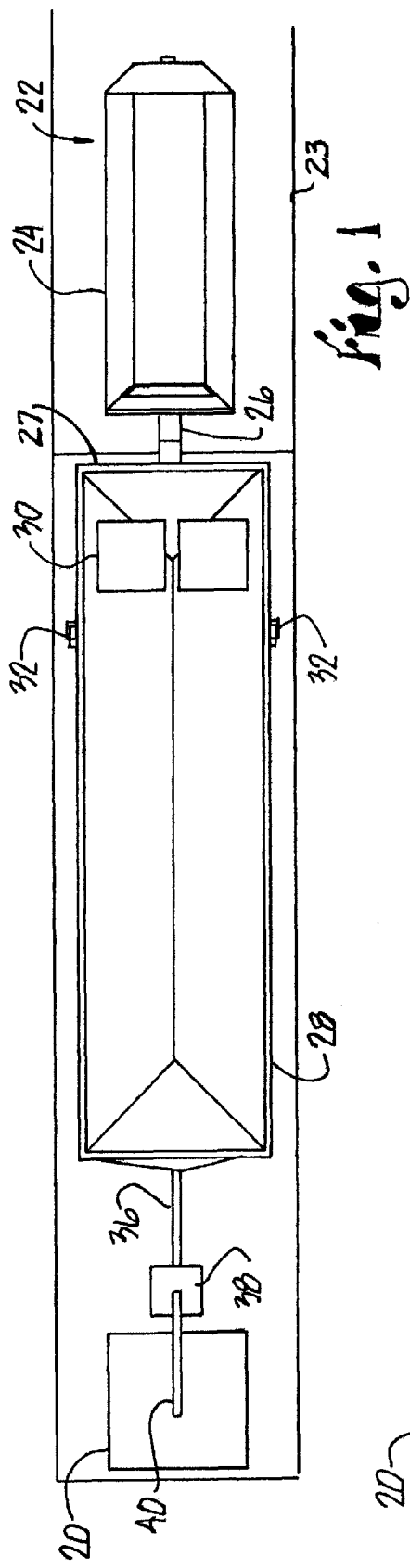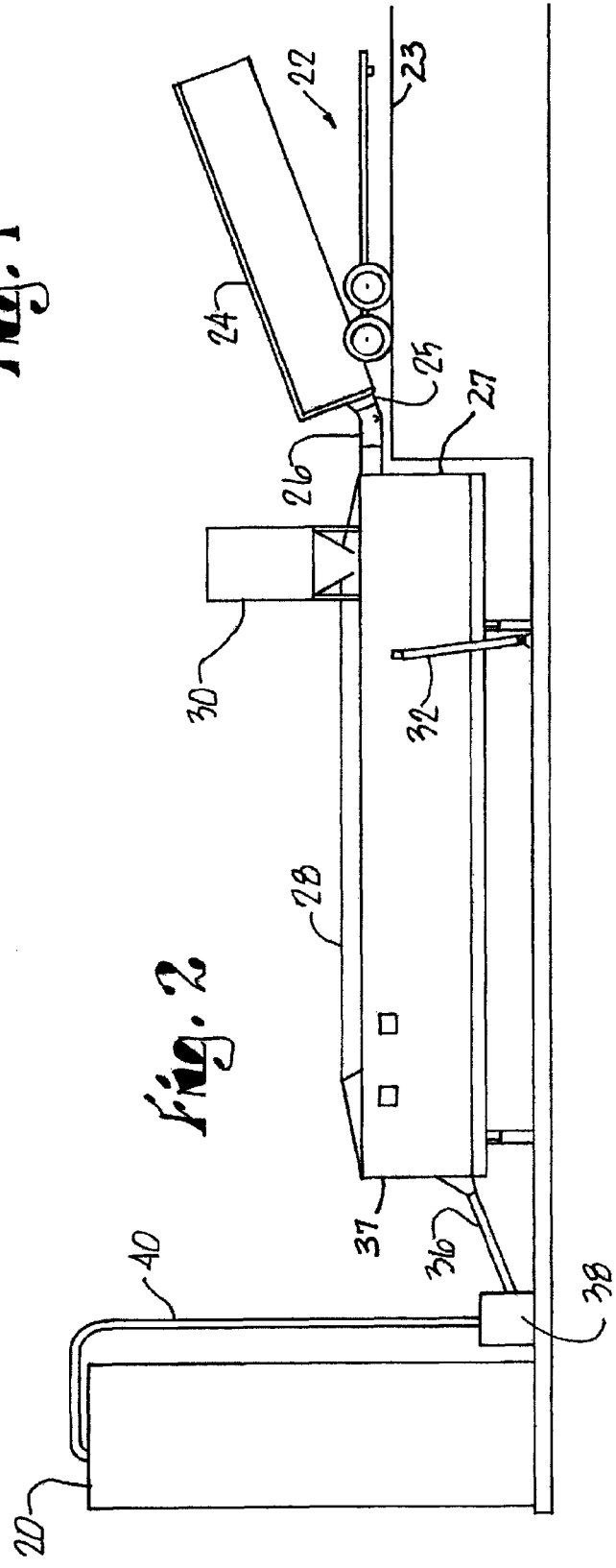

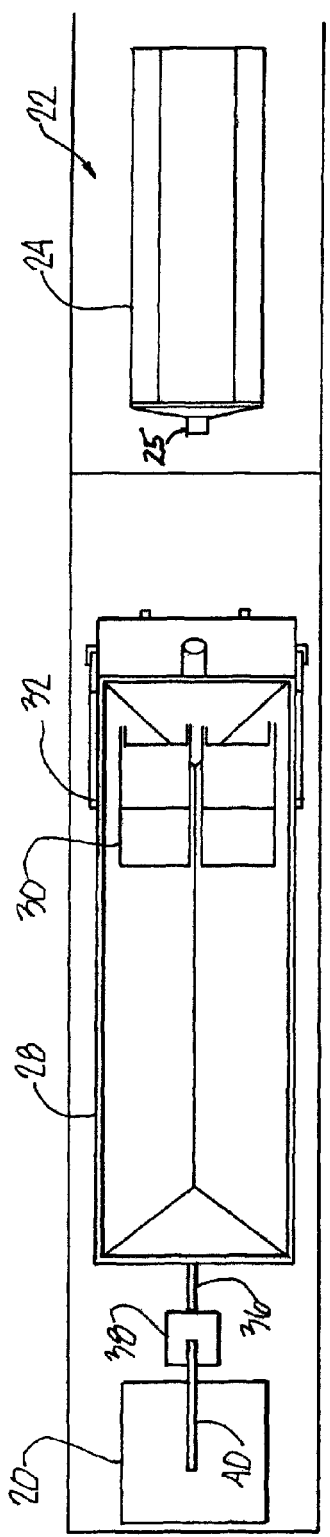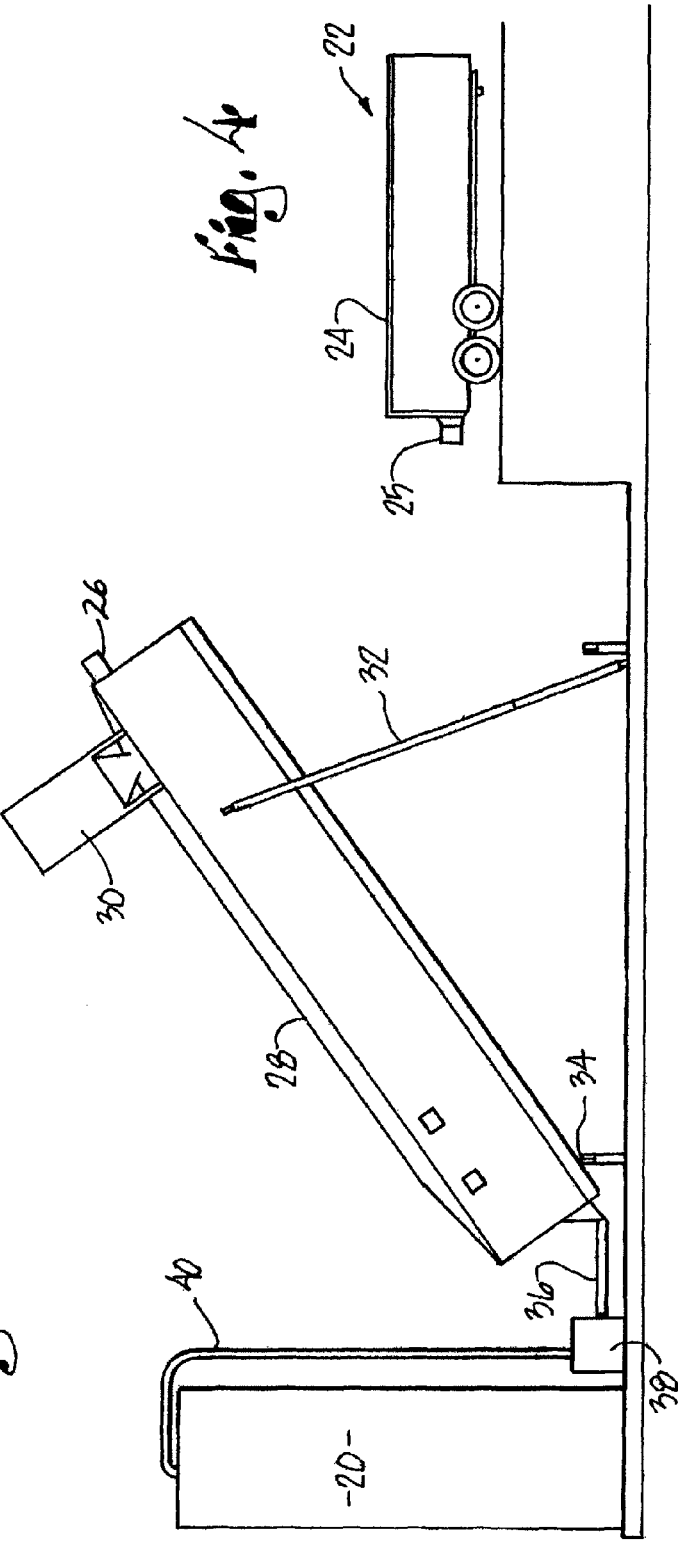

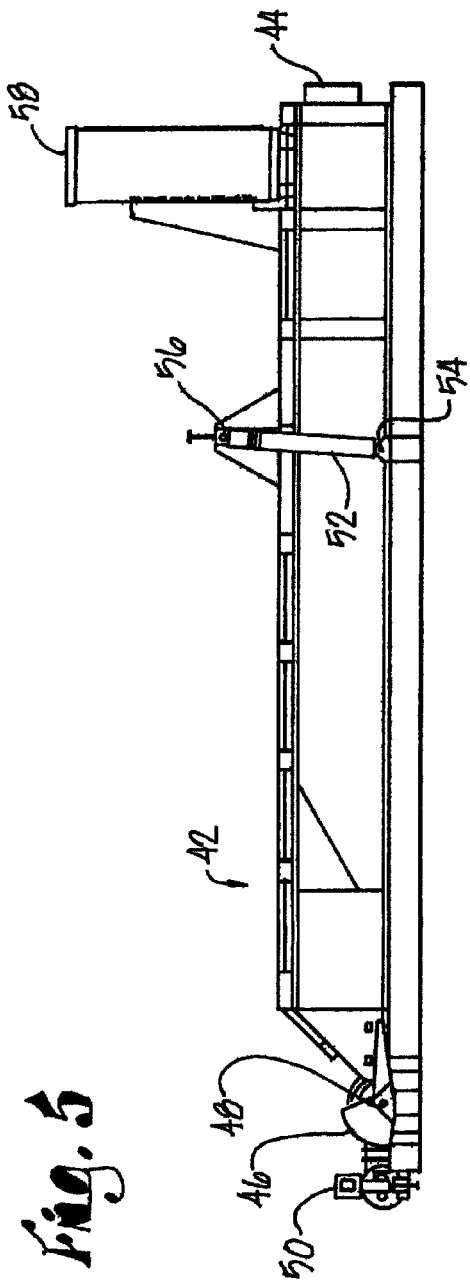
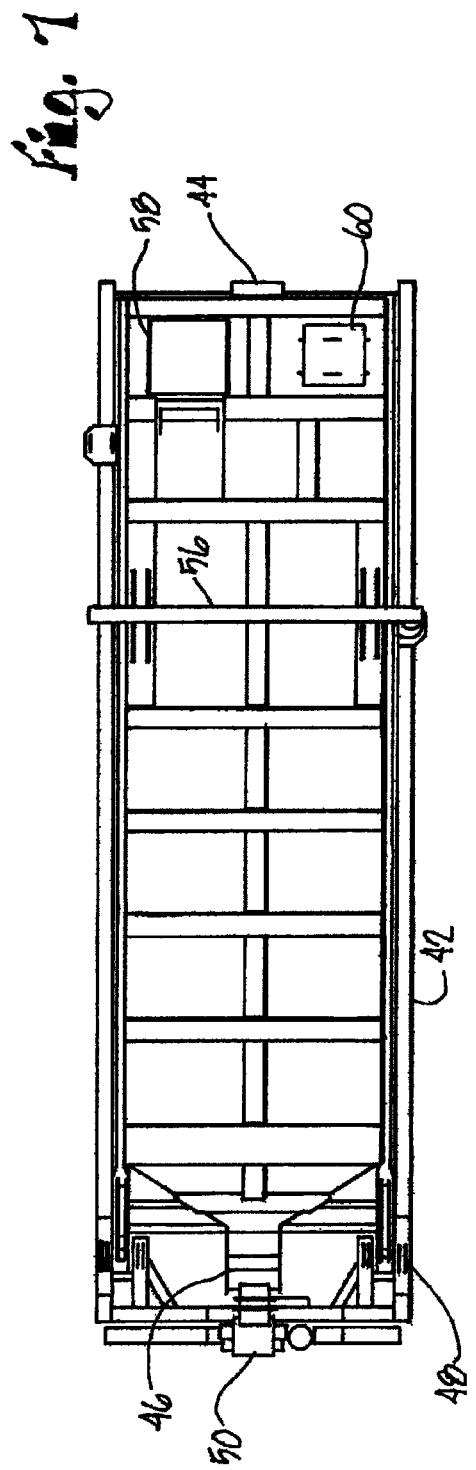

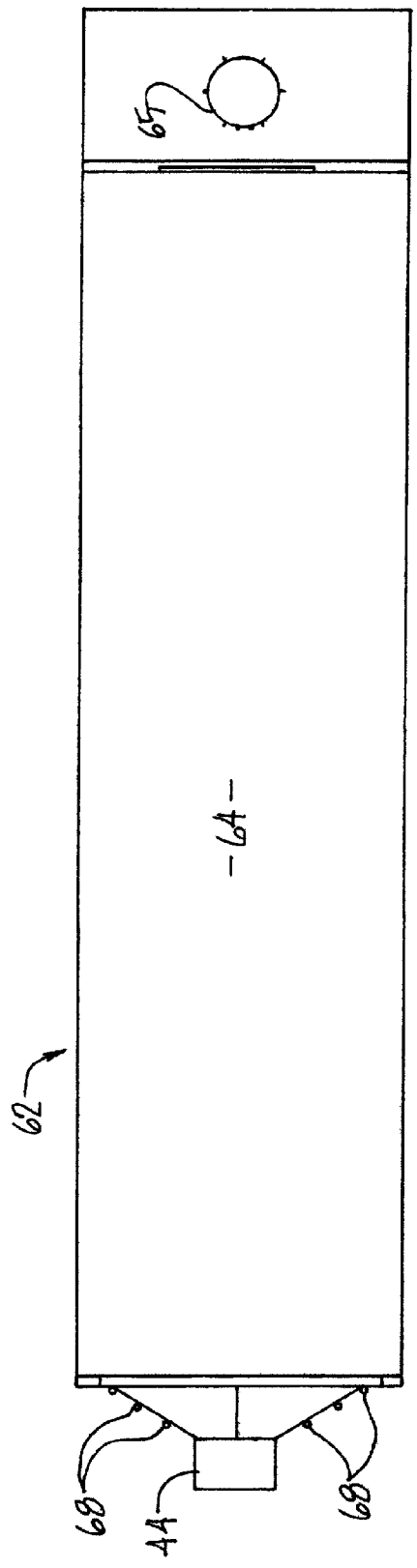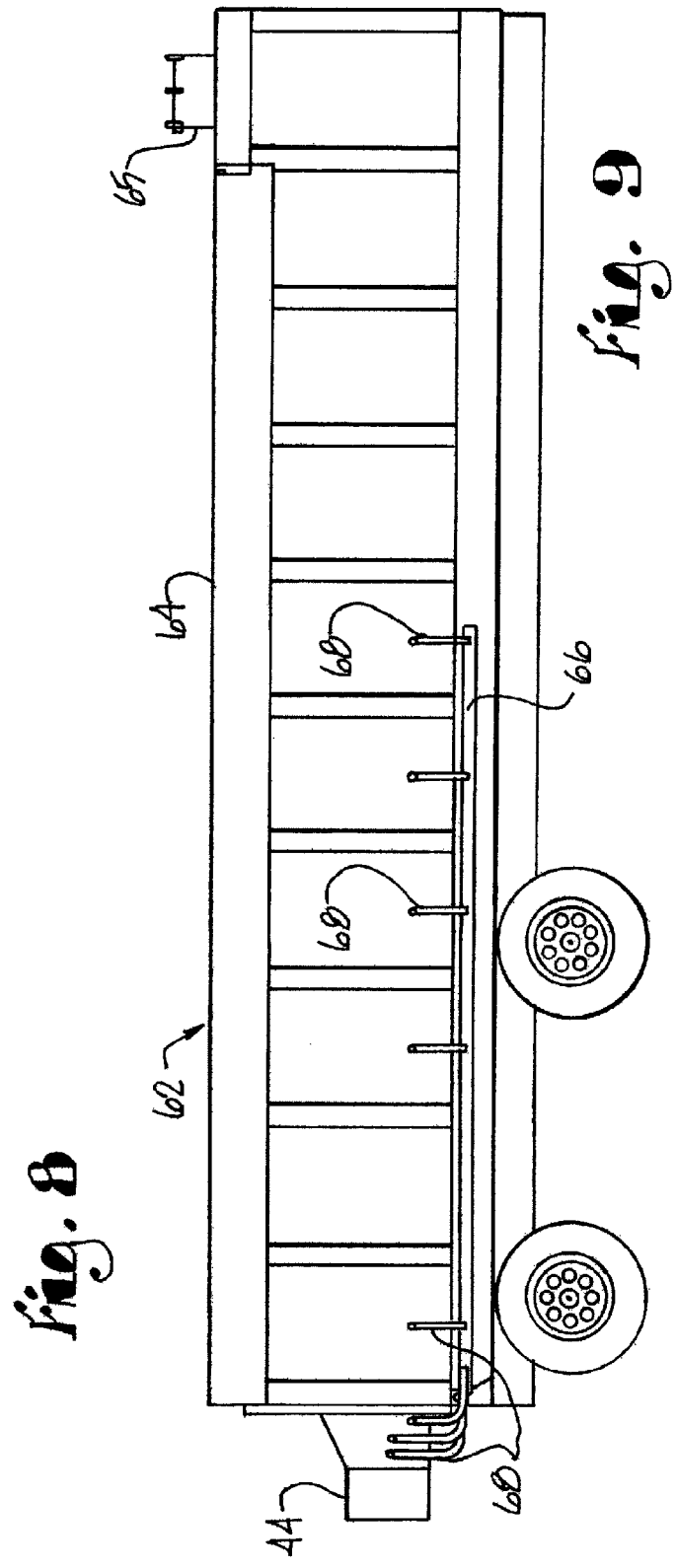

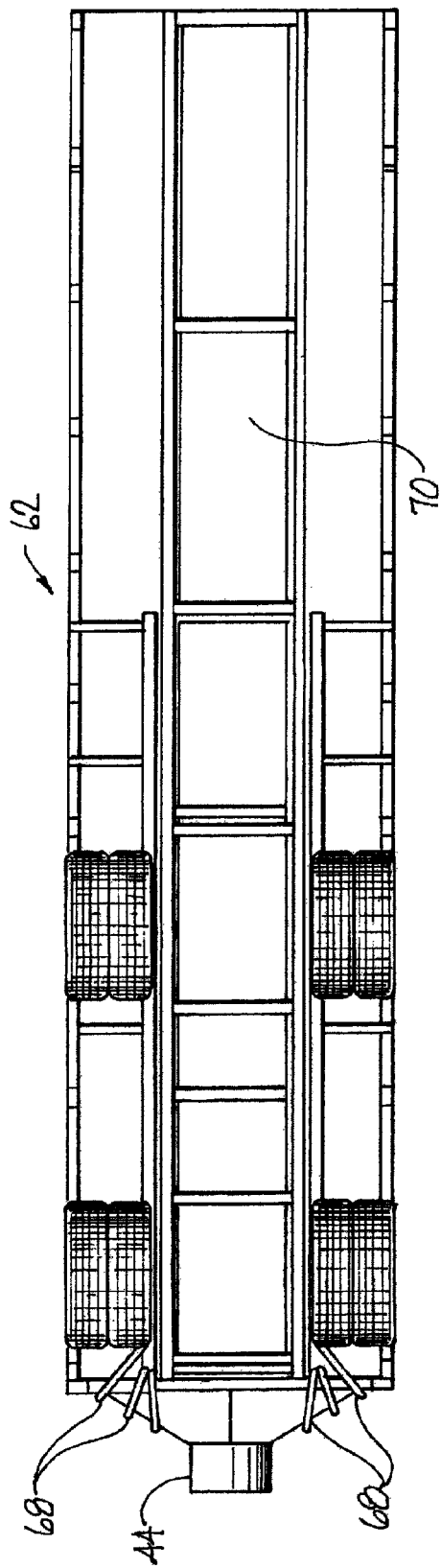
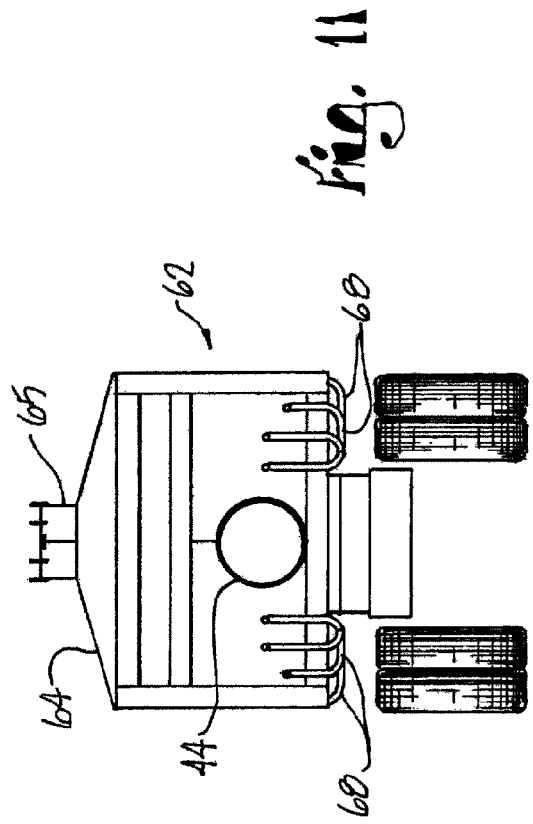

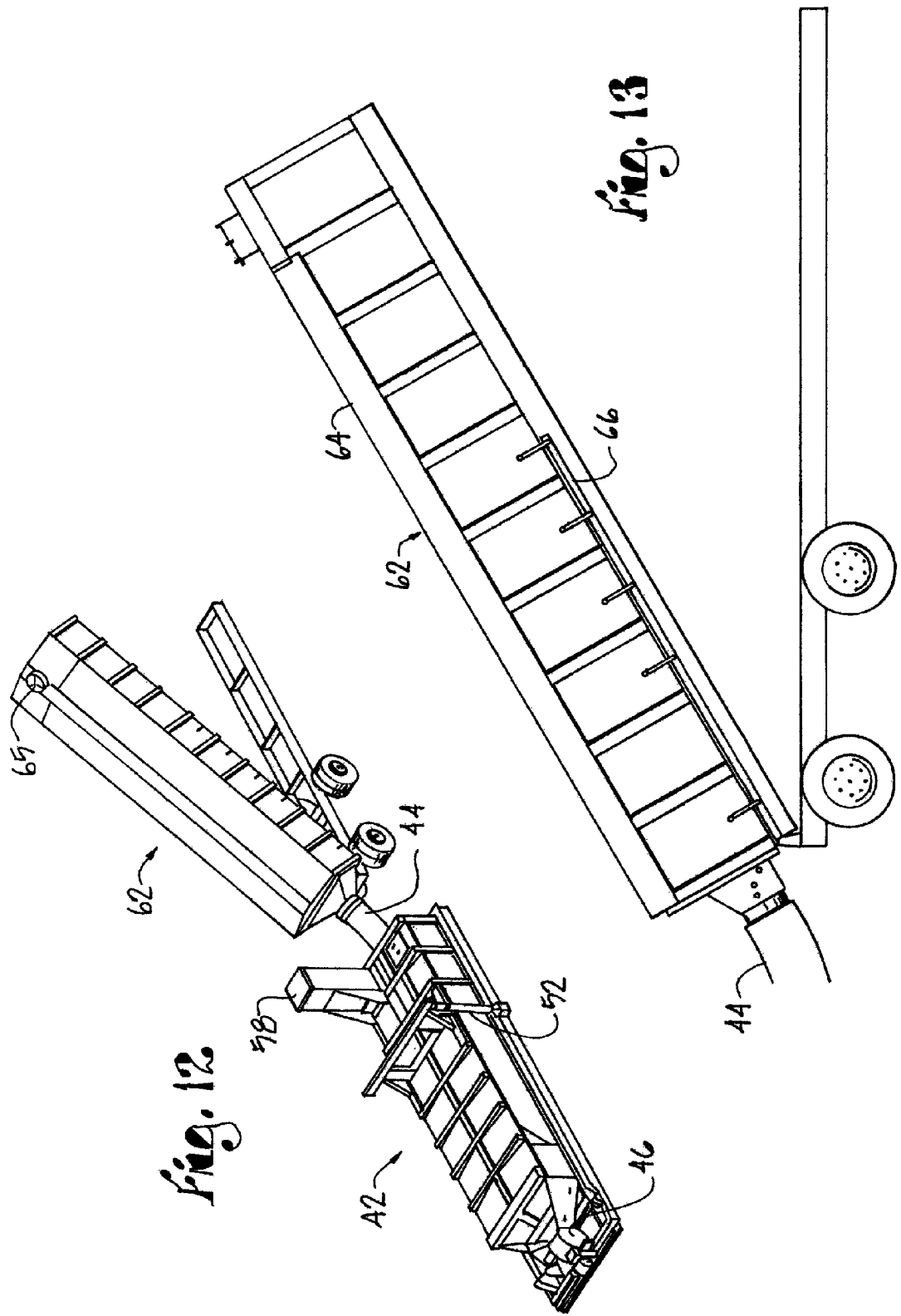

US 9,051,137 B2

CEMENT SILO LOADING SYSTEM

CROSS REFERENCE TO RELATED APPLICATION

This application claims the benefit of provisional application Ser. No. 61/419,601, filed Dec. 3, 2010, entitled CEMENT SILO LOADING SYSTEM.

This invention relates to improvements in the delivery of cement from dump trucks to a receiving silo and, more particularly, to a system for rapidly sequentially unloading the trucks so that each truck may quickly return to service and pick up another load.

BACKGROUND OF THE INVENTION

Shipments of cement in powder form are typically transported in water-tight hopper style trucks that are unloaded at a receiving cement silo with the aid of conventional truck feeders and air supply systems. The unloading process takes about forty-five minutes to an hour for each truck. During this lengthy unloading process, the truck engine is running at a high rpm to maintain a constant flow of cement from the truck to the silo. Workers at the site are thus subjected to continuous, detrimentally high noise levels, particularly when a number of trucks are unloading simultaneously.

Furthermore, this lengthy unloading process increases fuel consumption and capital equipment, maintenance and labor costs. The truck driver is idle and may do nothing but wait during the unloading process. As the equipment is specialized, it may limit the opportunity for back hauls. Additionally, hopper style trailers are more expensive than conventional dump trailers, and have high capacity feeder and air systems on board which must be maintained to accommodate the transfer of the load from the truck to the receiving silo.

SUMMARY OF THE INVENTION

In the system of the present invention for loading a cement silo, a dump truck loaded with cement is fully unloaded in approximately eight to ten minutes (depending upon the size of the load) and can immediately return to service. The truck carrying its load backs up to an outer, input end of a cement receiver extending from the base of the silo. The truck is connected to the receiver by a flexible interfacing pipe which receives the cement discharged from the truck as the load bed is rotated by hydraulic cylinders to an angle sufficient to sustain constant flow through the pipe to the receiver. After the receiver has accepted the load of cement, it is rotated about a horizontal axis at its output end to deliver the cement to the silo by gravity flow to the base of the silo and then forced under air pressure to the top of the silo and discharged thereinto.

Other advantages of this invention will become apparent from the following description taken in connection with the accompanying drawings, wherein is set forth by way of illustration and example, an embodiment of the present invention.

BRIEF DESCRIPTION OF THE DRAWINGS

FIG. 1 is a diagrammatic, conceptual plan view showing a cement silo and the cement receiver of the present invention in communication with a dump truck (shown fragmentarily) for receiving a load of cement therefrom.

FIG. 2 is a side elevation of the loading system shown in FIG. 1.

FIG. 3 is a plan view showing the cement receiver of FIG. 1 in a raised position for delivery of cement to the silo.

FIG. 4 is a side elevation of the silo, cement receiver and dump truck shown in FIG. 3.

FIG. 5 is a side elevation showing the cement receiver of FIGS. 1-4 in detail in a stationary, lowered position.

FIG. 7 is a top plan view of the cement receiver of FIG. 6 in its lowered position;

FIG. 8 is a top plan view of a dump trailer;

FIG. 9 is a side elevation of the dump trailer;

FIG. 10 is a bottom plan view of the dump trailer showing a vibration unit;

FIG. 11 is a rear elevation of the dump trailer showing a modified tail gate;

FIG. 12 is an isometric view showing discharge of the contents of the dump trailer into the cement exchange receptacle; and FIG. 13 is a side elevation showing a covered dump truck chassis modified in accordance with the teachings of the present invention.

DETAILED DESCRIPTION

Figure 6:
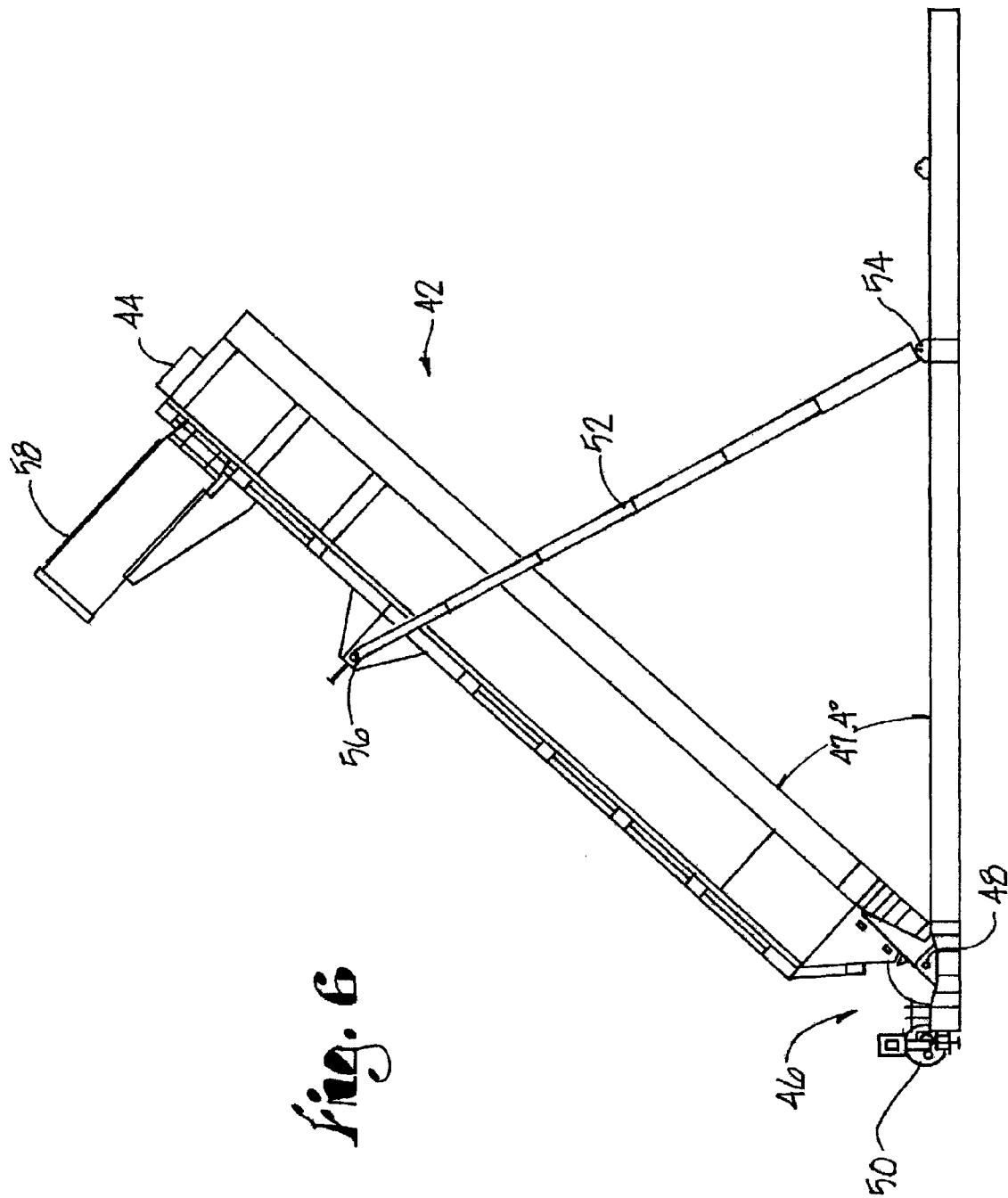
FIG. 6 is a side elevation showing the cement receiver of FIG. 5 rotated to an angle for discharge of the loaded commodity.

Referring initially to FIGS. 1-4, a conventional cement silo is diagrammatically illustrated at 20 and, in the present invention, receives cement from an elevated dump truck fragmentarily illustrated at 22 and positioned on a platform 23. A box bed 24 is hinged at the rear of the truck 22 and hydraulically operated to lift the front of the bed 24 (FIG. 2) to allow the contents thereof to be discharged via an intake conduit 26 into a cement receiver 28 at an outer receiving end 27 thereof. The conduit 26 may be provided with a butterfly valve (not shown) to control discharge of cement from the bed 24 into the cement receiver 28. A dust collector 30 extends upwardly from the top of receiver 28 adjacent the receiving end 27. The bed 24 is shown in its raised position in FIGS. 1 and 2 for discharge of the load of cement into the receiver 28.

Referring to FIGS. 3 and 4, the cement receiver 28 is shown in a raised position for delivery of a load of cement from the receiver to the silo 20. The receiver 28 is raised to the discharge position when, for example, four loads of cement from the dump trucks 22 have been delivered to the receiver 28. A pair of hydraulic cylinders 32 are extended (FIG. 4) to rotate the receiver 28 about a transverse, horizontal axis at 34 to discharge the cement through an outlet pipe 36 at the delivery end 37 of receiver 28 and into a blowoff station 38 adjacent the base of the silo 20 where the cement is carried by an airstream via a riser pipe 40 to the top of the silo 20 and discharged downwardly thereinto. Accordingly, the cement is forced under air pressure through riser pipe 40 to the top of the silo 20 and then discharged into the silo.

During the period that the cement receiver 28 is disconnected from the conduit 26 as shown for example in FIG. 4, the bed 24 of the unloaded dump truck 22 is returned to its normal position as shown in FIGS. 3 and 4. Therefore, the truck 22 may leave the site and pick up another load while the next truck to deliver cement is driven to the delivery position illustrated in FIGS. 3 and 4 ready to deliver another load of cement to the cement receiver 28 when the receiver returns to its lowered position shown in FIG. 2. The connecting conduit 26 is then joined to an outlet 25 at the rear end of the bed 24 and connected to the cement receiver 28 once unloaded and returned to the position thereof shown in FIG. 2. Accordingly, as long as there are loaded cement trucks waiting to be unloaded, the cement receiver 28 is in constant operation either receiving a fresh load of cement as shown in FIG. 2 or, upon actuation of the hydraulic cylinders 32, shifted to an unloading position (FIG. 4) where the cement is discharged into the silo 20. Typically, the time required to unload a fully loaded dump truck is approximately eight to ten minutes depending on the size of the load, although that time can be shorter or longer depending on the size of the load and the diameter of the connecting conduit 26.

FIGS. 5-13 show a detailed embodiment of the loading system of the present invention which operates in accordance with the loading system conceptually shown in FIGS. 1-4. A cement exchange receptacle 42 (FIGS. 5-7) provides the cement receiver into which the cement is delivered through a flexible interfacing pipe shown fragmentarily at 44 corresponding to the conduit 26 shown in FIGS. 1 and 2. Although only one pipe inlet 44 is shown in FIGS. 5-7, the receiver 42 can have several pipe inlets 44 if desired to increase the flow of cement from the dump truck bed 24 shown in FIGS. 1 and 2.

Referring to FIGS. 5-7 and 12, an embodiment of the cement receiver 42 is shown in greater detail and has a rotating discharge unit 46 which delivers the cement to a conventional, stationary feeder system 50 for ultimate discharge into the cement silo 20 shown in FIGS. 1-4. The feeder system remains stationary while the receiver is raised and lowered to empty successive loads. FIG. 5 shows the receptacle in its lowered position, whereas in FIG. 6 the raised position is shown as the unit is rotated to a 47.4° angle about a horizontal axis 48 of the rotating discharge unit 46, thereby permitting the load to flow by gravity into the feeder system 50 where an airstream carries the cement to the cement silo 20 (FIGS. 3 and 4). This may be appreciated from a comparison of FIGS. 5 and 6, raising of the receiver 42 from the loading position (FIG. 5) to the discharge position (FIG. 6) being effected by a pair of telescoping hydraulic cylinder assemblies 52 on respective sides of the receiver 42. As seen in the side elevational views of FIGS. 5 and 6, the assemblies 52 are on respective sides of the receiver 42 and pivot at their lower ends on a common transverse axis 54 and are joined at their upper ends at a transverse axle 56 mounted on top of the receiver 42.

A dust collector (bag house) 58 is provided at the inlet end of the receiver 42, projects upwardly therefrom and receives cement dust produced during delivery of the cement powder from the dump trucks. Maintenance access to the receiver is provided by a hatch 60 (FIG. 7).

A dump trailer 62 having features described below is shown in FIGS. 8-13 and, when rotated to a raised position as shown in the conceptual illustration of the box bed 24 in FIGS. 1 and 2, trailer 62 quickly discharges the cement loaded therein into the receiver 42. The trailer 62 is covered by a tarp 64 across its top from front to rear so that cement loaded therein is kept dry and maintained entirely within the trailer 62 during the unloading process. A lid 65 at the front section of the trailer provides access to the interior. The trailer 62 illustrated is a modified end dump trailer having an airline tube 66 extending longitudinally along each side thereof (one side being shown in FIG. 9) for the purpose of injecting air under pressure into the interior of the trailer at nozzles 68 to aerate the cement on each side of the trailer and the rear thereof where the trailer is connected via pipe 44 to the receiver 42. Although the airline tube 66 is shown extending along approximately the rear half of the length of the trailer 62, it may be appreciated that it may extend further forward with additional nozzles if desired to assure complete and rapid transfer of the cement from the truck to the receiver. A vibration unit 70 (FIG. 10) extending front to rear on the bottom of the dump trailer 62 assures that the cement is released and the truck is completely empty.

It is to be understood that while certain forms of this invention have been illustrated and described, it is not limited thereto except insofar as such limitations are included in the following claims.

The invention claimed is:

1. An apparatus for rapidly loading a cement silo with cement delivered by a dump truck, said apparatus comprising:
   a cement receiver adjacent a base of the silo, said cement receiver having an intake conduit for receiving cement from the dump truck and discharging the cement through an outlet, and
   a blowoff station adjacent the silo and communicating with said cement receiver, said station having a riser pipe extending upwardly therefrom and communicating with the silo for discharging the delivered cement into the silo, whereas loads of cement are sequentially delivered to the silo,
   wherein said cement receiver has a first position for receiving the cement from the dump truck, and a raised position for discharging the cement through said outlet to said blowoff station.

2. The apparatus as claimed in claim 1, wherein the dump truck is elevated above said intake conduit of said cement receiver.

3. The apparatus claimed in claim 1, further comprising said dump truck having airline tubes extending longitudinally along opposite sides of said dump truck connected to two or more nozzles for injecting air under pressure into an interior of said dump truck.

4. The apparatus claimed in claim 1, further comprising a vibration unit secured to said dump truck.

5. A method of rapidly loading a cement silo with cement delivered by a dump truck, said method comprising the steps of:
   providing a cement receiver extending outwardly from a base of the silo for receiving cement delivered thereto from the dump truck when said cement receiver is in a first position,
   discharging the cement through an outlet of said cement receiver when said cement receiver is in a raised position,
   providing a blowoff station adjacent the silo for receiving the cement discharged from said outlet, and
   extending a riser pipe upwardly from said blowoff station and communicating said pipe with said silo for discharging the delivered cement downwardly into said silo, whereby loads of cement are rapidly sequentially delivered to the silo.

6. The method of claim 5, wherein the dump truck is elevated above said intake conduit of said cement receiver.

7. The method of claim 6, further comprising the step of injecting air under pressure into an interior of said dump truck.

8. The method of claim 6, further comprising the step of vibrating said dump truck.

* * * * *